United States Patent [19]

Grunberg et al.

[11] Patent Number: 4,723,642
[45] Date of Patent: Feb. 9, 1988

[54] SPEED CHANGE DETECTING DEVICE FOR CONTROLLING A CLUTCH ASSOCIATED WITH A GEARBOX

[75] Inventors: Pierre Grunberg, Paris; Christian Pankowiak, Saint-Ouen, both of France

[73] Assignee: VALEO, Paris, France

[21] Appl. No.: 816,612

[22] Filed: Jan. 6, 1986

[30] Foreign Application Priority Data

Jan. 9, 1985 [FR] France ................. 85 00243

[51] Int. Cl.$^4$ ........................................... B60K 41/22
[52] U.S. Cl. ................................. 192/3.55; 192/3.54; 192/3.62
[58] Field of Search ............... 192/3.54, 3.55, 3.62, 192/3.63, 3.56, 3.58; 200/61.88, 61.91

[56] References Cited

U.S. PATENT DOCUMENTS

| | | | |
|---|---|---|---|
| 2,592,576 | 4/1952 | Kelbel | 192/3.58 X |
| 2,846,036 | 8/1958 | Maurice et al. | |
| 2,886,665 | 5/1959 | Binder | 200/61.91 X |
| 2,956,444 | 10/1960 | Bensinger et al. | 192/3.56 X |
| 3,741,035 | 6/1973 | May | 192/3.54 X |
| 3,910,388 | 10/1975 | Moori et al. | 200/61.88 X |
| 4,144,424 | 3/1979 | Takeda et al. | 200/61.88 |
| 4,158,404 | 6/1979 | Yamashita et al. | 192/3.58 |
| 4,267,907 | 5/1981 | Hiraiwa | 192/3.56 |

FOREIGN PATENT DOCUMENTS

| | | |
|---|---|---|
| 2645145 | 4/1977 | Fed. Rep. of Germany . |
| 1075404 | 10/1954 | France . |
| 66197 | 5/1956 | France . |
| 984342 | 2/1965 | United Kingdom ............ 200/61.88 |
| 2058963 | 4/1981 | United Kingdom . |

Primary Examiner—Rodney H. Bonck
Attorney, Agent, or Firm—Young & Thompson

[57] ABSTRACT

A device detects forces in a gearbox operating linkage in order to control an automatic clutch operating system for the purpose of changing the gear ratio. The linkage comprises a shaft in the gearbox adapted to rotate between two limiting positions corresponding to selection of respective different gear ratios. It also comprises a deformable linkage element in the force detecting device adapted to move between two limiting positions corresponding to the limiting positions of the shaft. This deformable linkage element comprises two portions coupled together elastically by an elastic return device. The force detecting device comprises a speed parity detector adapted to assume a parity state representing the position of the shaft and varying according to which of its limiting positions the shaft is in. It also comprises a force direction detector associated with the deformable linkage element adapted to assume a state representing the configuration of this element, which varies according to whether the element is loaded in one or the other of two reference directions. These reference directions respectively correspond to movement of the deformable linkage element from one to the other of its limiting positions and vice-versa. The parity detector and force direction detector are connected to a processor circuit adapted to activate the automatic clutch operating system to disengage the clutch when the deformable linkage element is loaded in a direction tending to move the shaft to an unoccupied limiting position.

7 Claims, 7 Drawing Figures

SPEED CHANGE DETECTING DEVICE FOR CONTROLLING A CLUTCH ASSOCIATED WITH A GEARBOX

BACKGROUND OF THE INVENTION

1. Field of the Invention

The invention concerns the control of an automatic clutch operating system from the operating linkage of a gearbox associated with the clutch. It is applicable in particular but not exclusively to automotive vehicles.

2. Description of the Prior Art

As is known, an automatic clutch operating system is a system adapted to operate a clutch of its own accord in the engagement direction (to transmit torque) or disengagement direction (to interrupt transmission of torque) and operation of which is controlled by a control device adapted to selectively apply to it an activation signal. More often than not, a system of this kind comprises operating means such as a motor which either receives or does not receive an activation signal, an electrical signal for example.

There is already known from patent FR-1.075.404 (U.S. Pat. No. 2,846,036) and its patent of addition FR-66.197 applied for on July 13, 1984 a control device for activating and deactivating an automatic clutch operating system consisting of a "broken lever" type gear shift lever. The lever comprises two sections in general alignment, namely an operating section on which a user acts and a control section connected to a gearbox by an appropriate operating linkage. The operating section can move relative to the control section; the two sections comprise two respective electrical conductors adapted to make or break a contact when the operating section is inclined relative to the control section due to the action of a user.

Clutch control devices of this kind have disadvantages, in particular that of in practice causing disengagement of the clutch immediately after the speed change lever is loaded, in particular irrespective of the direction of loading. This may result in unwanted disengagement of the clutch, which may prove prejudicial to a good service life of the clutch and to safety and comfort in the case of an automotive vehicle. Also, in these devices, the end of disengagement of the clutch is generally controlled with insufficient precision to bring about changes of gear ratio with all the required flexibility.

A principal objective of the present invention is to alleviate this disadvantage by means of a control system adapted to operate only when loaded in the direction to disengage the gear ratio selected. Another objective is to permit the clutch to remain disengaged until a new gear ratio is selected. Another objective is to provide for adequate control over a clutch operating system without exaggerated wear between the operative components, that is to say a control system the performance of which is maintained over a long period.

SUMMARY OF THE INVENTION

The present invention consists in a device for detecting forces in a gearbox operating linkage for the purpose of controlling an automatic system for operating a clutch associated with said gearbox in order to change the gear ratio, said linkage comprising a shaft in said gearbox adapted to rotate between two limiting positions corresponding to selection of respective different gear ratios, a deformable linkage element in said force detecting device adapted to move between two limiting positions corresponding to said limiting positions of said shaft and comprising two portions, and elastic return means by which said two portions of said deformable linkage element are coupled together and elastically urged towards a neutral configuration, said force detecting device comprising a speed parity detector adapted to assume a parity state representing the position of said shaft and varying according to which of its limiting positions said shaft is in, a force direction detector associated with said deformable linkage element adapted to assume a state representing the configuration of said deformable linkage element which varies according to whether said deformable linkage element is loaded in one or the other of two reference directions, respectively corresponding to movement of said deformable linkage element from one to the other of its limiting positions and vice versa, and a processor circuit to which said parity detector and said force direction detector are connected adapted to activate said automatic clutch operating system so as to disengage said clutch when said deformable linkage element is loaded in a direction tending to move said shaft to an unoccupied limiting position.

A force detecting device in accordance with the invention is thus adapted to recognize a force applied to the gear lever, on the input side of the operating linkage, in a direction adapted to bring about a change of gear ratio, and to activate the automatic clutch operating system in this case only. Note that the device is also adapted to re-engage the clutch only when the shaft reaches a limiting position previously unoccupied since it is only then that the force applied to the deformable linkage element ceases to be appropriate for moving the shaft to an unoccupied position.

The speed parity detector advantageously comprises a cam fixed to the shaft and cooperating with followers associated with respective limiting positions, each follower changing state (depressed or not) only when the shaft reaches the corresponding limiting position.

The force direction detector is advantageously formed by three conductors connected to three terminals of which one, carried by one of the sections, is disposed between the other two, carried by the other section; the three conductors conjointly constitute a three-contact switch the state of which represents the relative configuration of the two sections of the deformable linkage element.

The deformable linkage element is, in principle, any element of the gearbox operating linkage. Nevertheless, the invention provides for it to be the gear lever itself, as in the aforementioned documents U.S. Pat. No. 2,846,036 and FR-66.197, or the element which follows it, which is mobile in translation.

Other objects, characteristics and advantages of the invention will emerge from the following description given by way of non-limiting example and with reference to the accompanying drawings.

DESCRIPTION OF THE PREFERRED EMBODIMENTS

Figure 1:
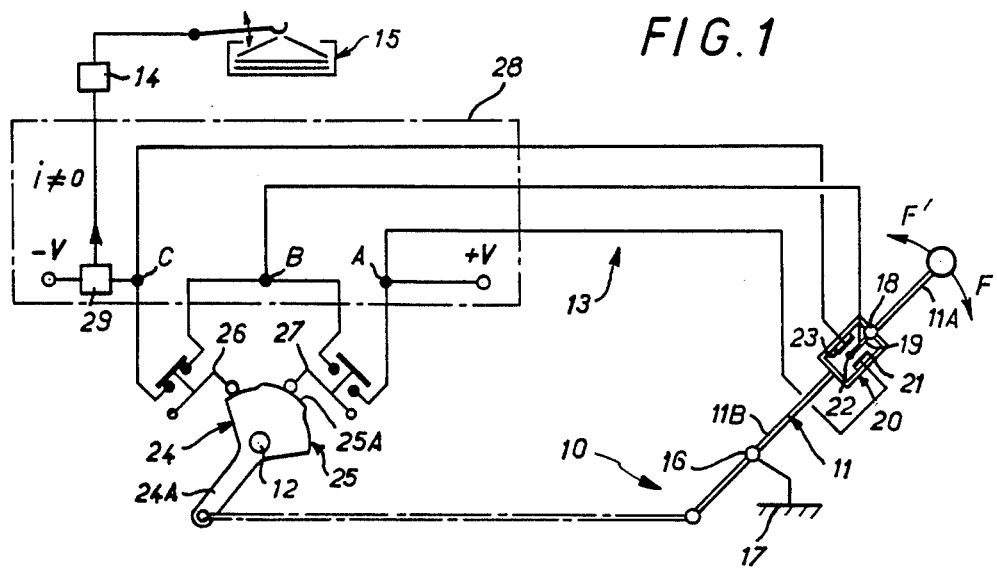
FIG. 1 is a schematic diagram of a force detection device according to a first embodiment of the invention.

FIG. 1 is a schematic representation of an operating linkage 10 comprising on the input side a gear shift lever 11 and terminating on the output side at a shaft 12 or "passing shaft" of a gearbox (not shown), this shaft being rotatable between two limiting positions corresponding to selection of respective different gear ratios in the gearbox.

Associated with the linkage 10 is a force detection device, generally referenced 13, adapted to control an automatic operating system 14 adapted to control disengagement or re-engagement of a clutch (schematically indicated at 15) so as to permit changes of gear ratio within the gearbox.

In the known manner this force detection device comprises a deformable linkage element, the lever 11 in this instance, which comprises an input section 11A, adapted to be operated by a user, and an output section 11B. This "broken" lever 11 is mounted on a frame 17 by its output section to pivot at 16 between two limiting positions corresponding to the limiting positions of the shaft. The sections 11A and 11B are capable of relative angular displacement by virtue of an articulation 18. The input section 11A comprises a finger 19 which is engaged inside a housing 20 carried by the output section 11B.

In accordance with the invention the broken element 11 carries a force direction detector adapted to assume a state representing the configuration of the broken element, which differs according to whether the broken element is loaded in one or the other of two opposite reference directions, respectively corresponding to movement of the broken element from one to the other of its two limiting positions and vice-versa. These reference directions are situated in the plane of FIG. 1 and denoted F and F'.

In the example shown in FIG. 1 the force direction detector comprises three conductors connected to three terminals 21, 22 and 23 conjointly forming a three-contact switch adapted to make two contact pairs 21-22 and 22-23. The terminal 22 is carried by the finger 19 of the input section 11A whereas the terminals 21 and 23 are disposed in the housing 20 symmetrically relative to the terminal 22.

Figure 2:
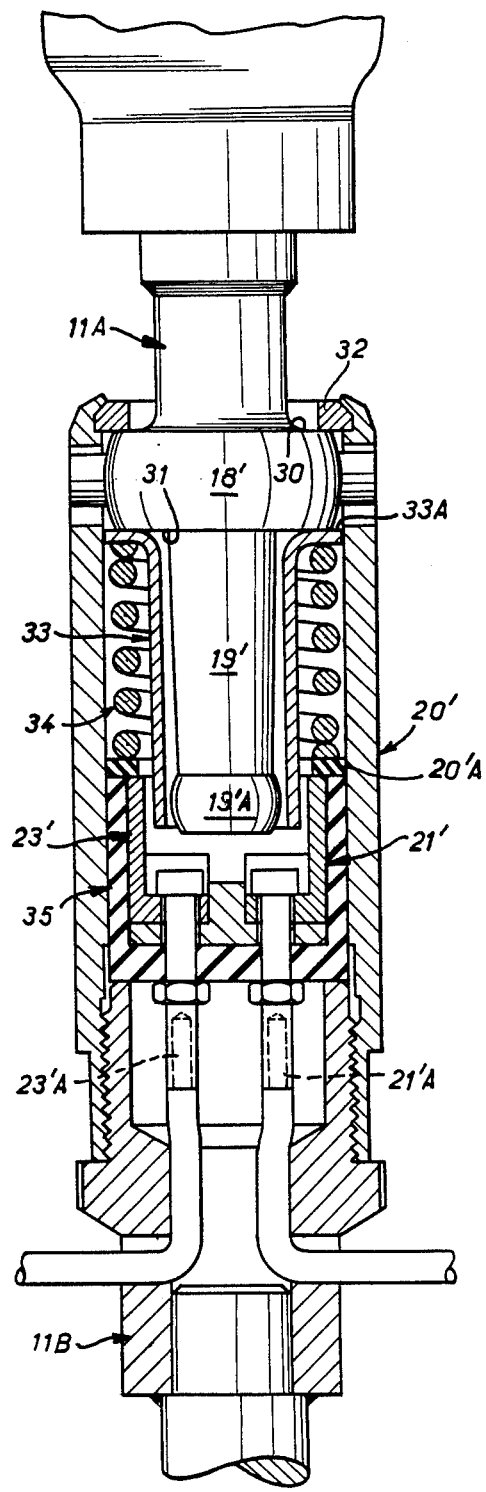
FIG. 2 is a view in cross-section showing a detail of one embodiment of the broken lever of FIG. 1.

In practice, as seen in FIG. 2, the sections 11A and 11B of the broken lever 11 are coupled elastically by means urging them into a neutral alignment configuration, but for reasons of clarity these means are not shown in FIG. 1. The switch formed by the terminals 21 through 23 can assume three states according to whether the input section is subject to a low or zero force (the terminals are all separated), a force in the direction of the arrow F' (the contact pair 21/22 is made) or a force in the direction of the arrow F (the contact pair 22/23 is made).

The force detection device 13 further comprises a speed parity detector adapted to assume a parity state representing the position of the shaft which varies according to whether the shaft is in the one or the other or neither of its limiting positions. In the example of FIG. 1 this speed parity detector is fixed to one end of the shaft 12 (see also FIG. 3). It comprises a transverse flange 24 advantageously comprising an arm 24A which is coupled to the remainder of the operating linkage; the edge of the flange opposite this arm forms a cam 25 against which bear two followers 26 and 27 offset angularly relative to the shaft so as to detect, in this instance through depression by the action of the cam 25, the shaft arriving at one or the other of its limiting positions. By convention, it will be assumed that the follower 26 corrresponds to odd gear ratios whereas the follower 27 corresponds to even gear ratios. In the case shown in FIG. 1, the follower 26 is in a disengaged configuration whereas the follower 27 is in a depressed configuration because of a projection 25A on the edge of the flange 24.

In the example of FIG. 1 the followers 26 and 27 are of the break contact switch type; the follower 26 is switch open closed position whereas the follower 27 is a switch open position.

The force detection device 13 of FIG. 1 further comprises a processor circuit to which the force direction detector 21-22-23 and the speed parity detector 24-2-5-26-27 are connected. This processor circuit, generally referenced 28, is adapted, according to the state of the speed parity detector and force direction detector, to activate the system 14 for automatically operating the clutch 15, in order to disengage the clutch, when the broken element 11 is loaded in a direction appropriate to moving the shaft 12 to a limiting position previously unoccupied.

In an extremely simplified form (FIG. 1) the circuit 28 is an electrical circuit connected to the terminals 21 through 23 and to the followers 26 and 27. The followers are connected in series between two terminals = and − between which a potential difference is applied, whereas the terminals 21, 22 and 23 are connected to points A, B and C respectively situated near the = terminal, between the followers 26 and 27 and near the − terminal. A current sensor 29 is disposed between the point C and the − terminal and is adapted to deliver an activation signal to the system 14 when a non-null current passes through it.

It may be verified that a force applied to the section 11A of the broken lever in the direction of the arrow F has the effect, from the mechanical point of view, of holding the shaft 12 in position. Such a force causes the contact pair 22/23 to be made, closing the circuit between B and C; however, no current passes between A and B, nor through the contact pair 21/22, nor through the follower 27; thus no current passes through the detector 29 and the system 14 is not activated, which is the required result.

If on the other hand the broken lever is loaded in the direction of the arrow F', the contact pair 21/22 is made and enables current to pass between A and B; as the circuit is closed between B and C via the follower 26, current passes through the detector 29 which activates the system: this is also the required result.

FIG. 2 shows in detail one embodiment of the junction between sections 11A and 11B of the broken lever. The articulation 18' between these sections comprises a ball carried by the section 11A and delimited by an upper shoulder 30 and a lower shoulder 31. The shoulder 30 bears against a transverse angular bearing surface 32 of the housing 20' carried by the output section 11B, whereas the shoulder 31 bears axially on a transverse flange 33A of a conductive bush 33. This bush is mounted with clearance in the housing 20' and its flange is acted on by a spring 34 bearing axially against a washer 20'A attached to the housing 20', in which the bush 33 is also mounted with clearance. Through the intermediary of the bush, the spring 34 tends to hold the shoulder 30 of the ball applied against the annular bearing surface 32 of the housing 20' and thus urges the sections 11A and 11B into a neutral alignment configuration. The finger 19' by virtue of which the section 11A is extended beyond the ball 18' is inserted with clearance into the bush 33 and terminates in a swollen tip 19'A. Within the housing 20', under the washer 20'A, are disposed two contact springs 21' and 23' fixed by screws into an insulative cylinder 35. These screws provide an electrical connection between the springs 21' and 23' and respective wires 21'A and 23'A.

When a force is applied to the section 11A in the plane of FIG. 2 the shoulder 30 of the ball 18' is tilted relative to the annular bearing surface 32 whereas the shoulder 31 remains in contact with the flange 33A of the bush 33, which tilts until it comes into contact with one or other of the springs 21' or 23'. If application of the force continues, the finger 19' tilts in turn relative to the bush 33 until its swollen tip touches it. The finger 19' is free to tilt in this way so that any force applied to it after the electrical contact is made will not damage the device.

In practice, and for reasons of safety, the section 11A is advantageously grounded through the intermediary of the section 11B, to avoid the user being subject to electrical discharges when he touches the lever 11. This results in appropriate modification to the associated processor circuit.

This processor circuit advantageously comprises a microprocessor which processes, after shaping, the signals generated by the various detectors.

Figure 3:
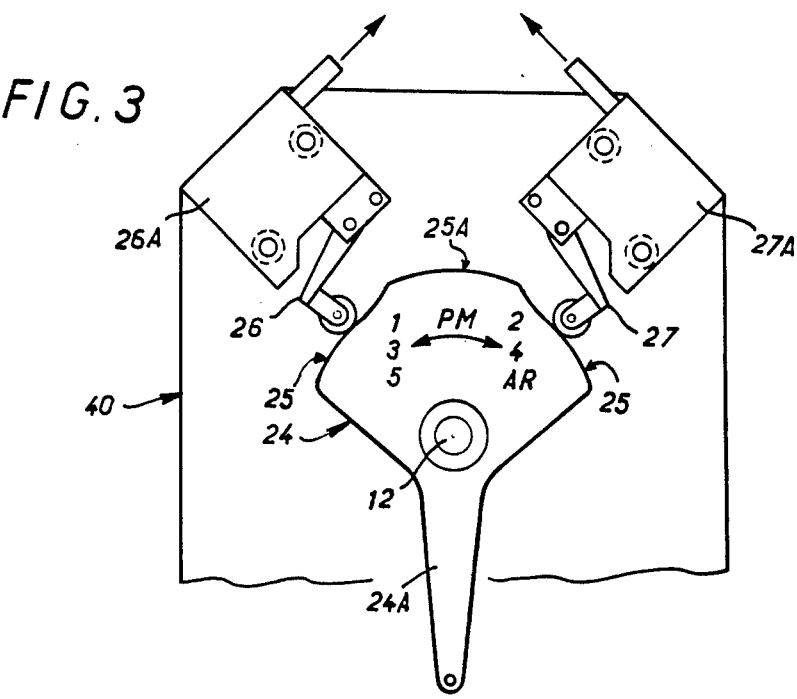
FIG. 3 is a front view of the speed parity detector of FIG. 1.

The structure of the speed parity detector of FIG. 1 is shown to a larger scale in FIG. 3. Note that here the followers 26 and 27 are both in the deployed state and the shaft in a neutral median configuration. The flange 24 is mounted at one end of the shaft which exits the housing 40 of the gearbox. The casings 26A and 27A of the followers are fixed to this housing.

Figure 4:
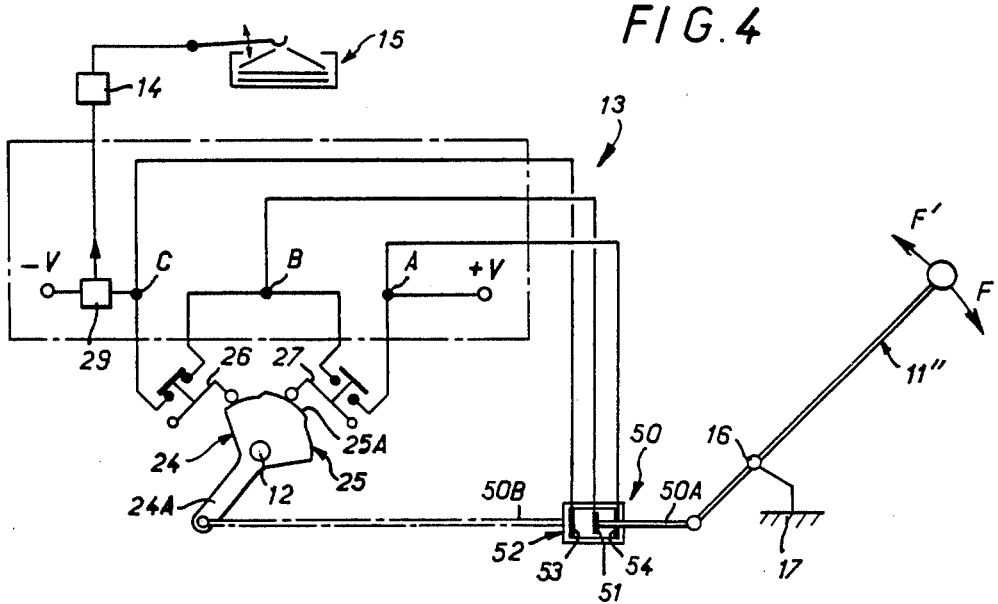
FIG. 4 is a schematic diagram of a force detector device according to a second embodiment of the invention comprising a deformable linkage element or broken element mobile in translation.

FIG. 4 shows a variation on FIG. 1 in which the broken element is no longer the lever 11' but a linkage element 50 which follows on immediately from it. This element is mobile in translation. It is made up of two sections, an input section 50A and an output section 50B coupled elastically by means that are not shown. In the simplified example of FIG. 4 the element 50A is a rod ending in a plate 51 sliding inside a cylinder 52 attached to the section 50B. The cylinder comprises on its transverse ends two conductors 53 and 54 that a terminal (not shown) carried by the plate 51 on both its sides can touch when the rod 50A is in respective extreme positions within the housing. These terminals 51, 53 and 54 conjointly form, as previously, a three-way switch and the operation of the device of FIG. 4 is readily deduced from that of FIG. 1.

Figure 5:
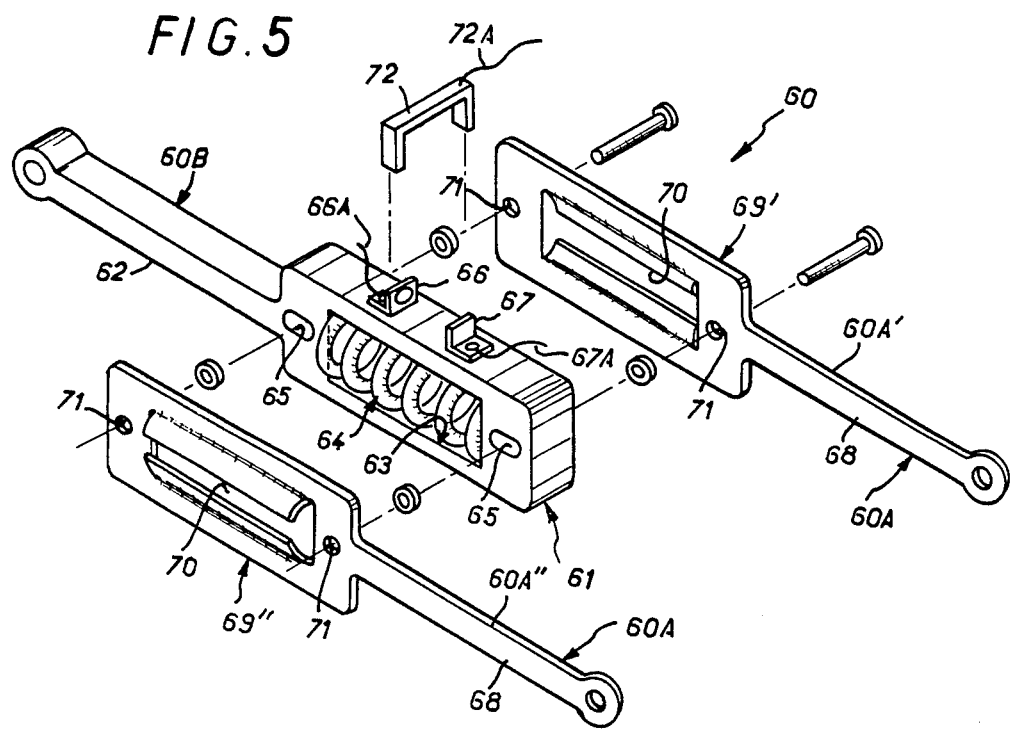
FIG. 5 is an exploded view in perspective of a broken element similar to that of FIG. 4.

FIG. 5 shows a more complex embodiment of the broken element. This broken element 60 comprises an input element 60B comprising a thick elongate frame 61 linked to a rod 62. The frame comprises an opening 63 adapted to receive a prestressed spring 64. In the short sides of the frame 61 are slots 65 extending parallel to the rod 62. To the edge of a long side of the frame are fixed springs 66 and 67 connected to wires 66A and 67A. The input section 60A of the broken element 60 comprises two flanges 60A' and 60A" adapted to bracket transversely the output element 60B. These flanges comprise bars 68 connected to plates 69' and 69" in which I-shaped openings 70 are cut and pressed out so as to be capable, after transverse application to respective sides of the opening 63 in the output section, of maintaining the spring 64 in position in this opening. These plates comprise bores 71 adapted to receive spacers adapted to fasten them on either side of the frame 61 of the output section 60B by passing through the latter by means of the slot 65. A stirrup-shaped contact spring 72 attached to a wire 72A is fixed to the two plates 69' and 69" so as to be disposed between the springs 66 and 67. Insulative elements are naturally provided to ensure appropriate insulation of the various contact springs.

It goes without saying that the preceeding description has been given only by way of non-limiting illustrative example and that numerous variations may be put forward by those skilled in the art without departing from the scope of the invention, in particular regarding the location and structure of the "broken" element and the force direction detector or the speed parity detector (the shape of the cam) which may be mounted on a linkage element disposed on the input side of the shaft, or with regard to the nature of the processor circuit.

Figure 6:
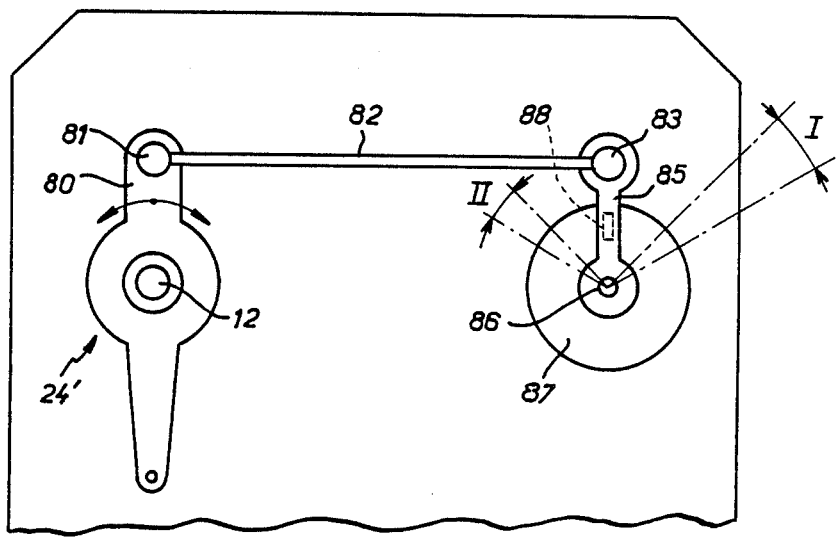
FIG. 6 shows a variation on the speed parity detector of FIG. 3.

Thus, FIG. 6 illustrates another embodiment of the parity detector of FIG. 3, in which followers are replaced by a potentiometer or an analogeous angle measuring component. More precisely, flange 24' does not comprise any cam but a radial projection 80 articulated in 81 to an end of a small tierod 82. The other end of tierod 82 is articulated in 83 to a lever 85 fixed to the shaft 86 of a potentiometer 87. With this arrangement, the angular position of the slider 88 inside the potentiometer becomes representative of the position of shaft 12. For example a current or voltage measure corresponding to a slider position in region I will indicate an even gear ratio or reverse gear, a current or voltage measure corresponding to a slider position in region II will indicate an odd gear ratio and a current or voltage measure corresponding to a slider position between said regions will indicate gear disengagement.

Figure 7:
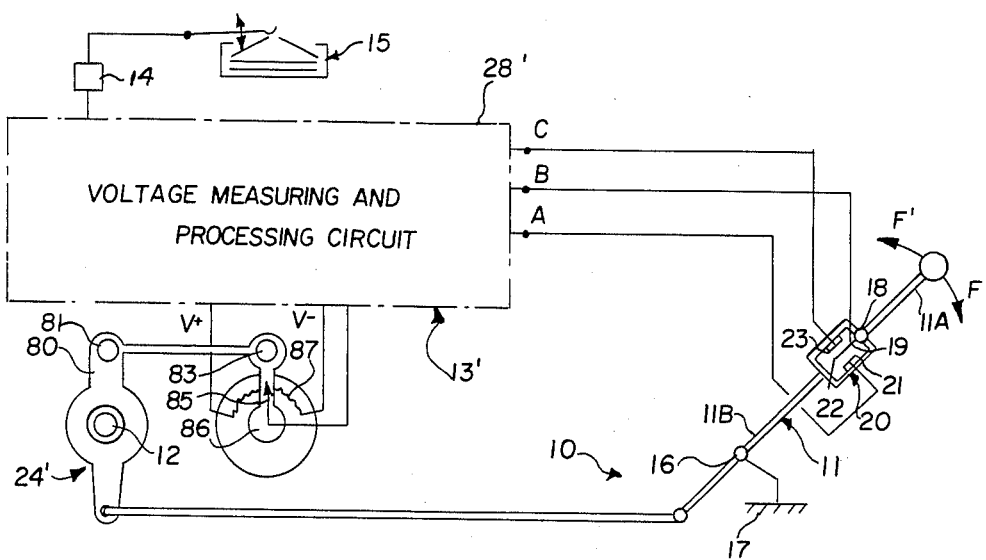
FIG. 7 is a schematic diagram of the force detection device showing the deformable linkage of FIG. 1 with the parity detector of FIG. 6.

FIG. 7 illustrates the cooperation of the deformable linkage of FIG. 1 with the parity detector of FIG. 6, in which the slider 85 of the potentiometer 87 is representative of the position of the shaft 12.

As in the embodiments of FIGS. 1 and 3 there is provided a processor circuit 28' which is adapted, according to the state of the speed parity detector and the force direction detector, to activate the system 14 for automatically operating the clutch 15.

The processing circuit 28' includes voltage measuring means for measuring the voltage of the slider 88 which is a function of the angular position of the shaft 12. The voltage of the slider 88 which correlates to the region I indicates an even number gear or reverse gear, the region II indicates an odd number gear and between the regions I and II the voltage corresponds to neutral gear.

The position of the slider 85 in the region I indicating an even number gear or reverse gear will provide a corresponding voltage on the lead between the slider and the processing circuit which is adapted to be measured by the voltage measuring means of the processing circuit. The position of the slider in region II and between regions I and II will likewise provide corresponding voltages on the lead between the slider measured by the voltage measuring and processing unit.

Thus, for example, for an even gear number or reverse gear the potentiometer will be at high voltage value, for an odd number gear a low voltage value and for neutral an intermediate voltage value.

The force direction detector is identical to that of the embodiment of FIG. 1. Thus contact is made between the contacts 21 and 22 and points A and B on the corresponding leads when the section 11A is rocked in the direction F' (or push direction) and likewise contact is made between contacts 22 and 23 and points B and C when the section is rocked in the direction of arrow F (or pull direction).

Thus, in case of a low voltage value measurement and the section 11A pushed in the direction F' a signal is delivered by the processor circuit 28' to the automatic operating system 14 to disengage the clutch or when the section 11A is no longer pushed in the direction F' a signal is delivered to the automatic operating system 14 to cause clutch reengagement. Likewise if high voltage value is measured and the section 11A is being pulled in the direction F a signal will be delivered by the processor circuit 28' to the automatic operating system 14 to disengage the clutch and once the section 11A is no longer pulled in the direction F the signal delivered by the processor circuit 28' to the automatic operating system 14 will cause the clutch to be reengaged.

What we claim is:

1. A gearbox operating linkage for controlling an automatic clutch operation system associated with a gearbox in order to change the gear ratio, said linkage comprising a shaft in the gearbox adapted to rotate between two limiting positions corresponding to respective gear ratios, a deformable linkage having two portions and movable between two limiting positions corresponding to said limiting positions of said shaft and elastic return means coupling together and elastically urging said two portions of said deformable linkage toward neutral configuration, a gear ratio parity detector having parity states corresponding to the limiting positions of said shaft, said parity detector comprising a potentiometer responsive to the angular position of said shaft, said potentiometer having regions corresponding to the limiting positions of said shaft for defining the parity states, a force direction detector associated with said deformable linkage having loading states corresponding to the loading direction and to movement of said deformable linkage from one of the limiting positions to the other, and said parity detector and said force direction detector being connected to a processor circuit adapted to activate said automatic clutch operating system so as to disengage said clutch when said deformable linkage is loaded in a direction tending to move said shaft to an unoccupied one of said limiting positions.

2. A linkage according to claim 1, wherein said force direction detector comprises three contact terminals disposed on said two portions of said deformable linkage so as to constitute a three-contact switch.

3. A linkage according to claim 2, wherein said deformable linkage defines a gear shift lever disposed on an input side of the gearbox operating linkage.

4. A linkage according to claim 2, wherein said deformable linkage is movable for translation and disposed immediately on an output side of a gear shift lever in the gearbox operating linkage.

5. A linkage according to claim 2, wherein said potentiometer includes a slider mounted for angular movement in response to angular movement of said shaft and said regions of said potentiometer are angularly spaced sectors.

6. A linkage according to claim 5, wherein said flange is fixed for angular movement with said shaft, and a link connecting said flange to a lever mounted for angular movement and carrying said slider.

7. A linkage according to claim 6, wherein said flange, link and lever together define a deformable linkage.

* * * * *